United States Patent Office 3,387,933
Patented June 11, 1968

3,387,933
PREPARATION OF METAL HYDRIDES
John C. Snyder, Darling, Pa., assignor to Hercules
Incorporated, a corporation of Delaware
No Drawing. Original application Nov. 30, 1962, Ser. No. 183,766. Divided and this application Sept. 1, 1964, Ser. No. 393,773
9 Claims. (Cl. 23—204)

ABSTRACT OF THE DISCLOSURE

Alkali metal hydrides are prepared from the metal and hydrogen by contacting at elevated temperature and pressure with a transition metal or halide or hydride thereof, such as titanium, in the presence of an inert organic diluent.

---

This application is a division of my application Ser. No. 183,766, filed Mar. 30, 1962.

This invention relates to an improved process for the preparation of alkali metal hydrides and more particularly to the preparation of the alkali metal hydrides from the metals and hydrogen.

The alkali metal hydrides and their aluminum hydride complexes are valuable reducing agents and chemical intermediates for many chemical reactions. While it is known that metal hydrides can be prepared by hydrogenation of the corresponding metal, the reaction requires high temperatures and pressures and generally results in only low or mediocre yields. Even more difficulty is encountered in the production of the metal aluminum hydrides. These have previously been prepared by reacting an aluminum halide with the corresponding alkali metal hydride or in a two-step process by reacting a previously formed alkali metal aluminum hydride with aluminum halide and then reacting the aluminum hydride with alkali metal hydride. However, both of these methods waste three moles of alkali metal hydride for every mole of alkali metal aluminum hydride produced. Obviously, if these metal aluminum hydrides could be produced in one step from the elements, great savings could be accomplished, but here again yields have been low.

The syntheses of the alkali metal hydrides and mixed metal hydrides from the elements involves the reaction of gaseous hydrogen with either solid or liquid metals, when producing the simple metal hydrides. The synthesis of lithium hydride is an example of the former, and of sodium hydride, an example of the latter. In the case of the mixed metal hydrides, gaseous hydrogen must be reacted with mixtures of solid metals or with mixtures of solid and liquid metals, such as in the synthesis of lithium aluminum hydride and of sodium aluminum hydride, respectively. These reactions between gases and metals, particularly to produce solids which are practically insoluble, or of very limited solubility, are mechanistically difficult and slow in absolute rate. They involve diffusion of hydrogen to the active reacting center on the metal surface, subsequent reaction, and formation of a solid product, which by its very presence impedes further reaction, particularly when it is insoluble, or of very limited solubility in any medium which can be used for reaction. The overall effect is for such reactions to occur to a very limited degree, and to be impeded from further progressing by the shielding of the surface by previously formed product.

Another difficulty in these reactions between metals and hydrogen resides in the fact that adherent surface coatings of oxide, or in some cases of nitride, practically prevent initial reaction. While such layers can generally be removed or minimized by comminution, such as by milling in a so-called "inert" medium or atmosphere, the active metal surface frequently welds or rewelds to other similar surfaces, unless protected by some adsorbed species. The adsorbed species may subsequently deter reaction with hydrogen.

Now in accordance with this invention it has been found that the alkali metal hydrides and mixed metal hydrides may be synthesized under milder conditions, in shorter reaction times, and in higher conversions, and frequently to give a more reactive product, when the synthesis reactions between hydrogen and the metal or metals, or between hydrogen, metal and metal hydride is carried out in the presence of a catalyst and further when the process is carried out in such a fashion that the reactants and products are continuously or intermittently subjected to comminution during the reaction. The direct synthesis of the alkali metal hydrides and mixed metal hydrides can, in accordance with this invention, be carried out more rapidly, under milder conditions, to a greater conversion or to give more reactive products, or a combination of these, if carried out in the presence of catalysts comprising transition metals or their compounds, or if such catalyst materials are mixed or alloyed with the original metal or metals. Thus, in accordance with this invention, any transition metal, metal hydride, or metal halide can be used to catalyze the synthesis of the alkali metal hydrides or mixed metal hydrides from the elements. The transition metals, or their compounds, that may be so used are the metals of Groups IV–B, V–B, or VI–B of the Periodic Table, which groups include titanium, zirconium, hafnium, vanadium, niobium, tantalum, chromium and molybdenum. The transition metal may be used as the free metal, or mixed or dissolved in the reacting metal. Exemplary of the compounds of these metals that may be used are titanium hydride, titanium tetra-, tri-, and dihalides such as the chlorides, bromides and iodides, the corresponding compounds of zirconium, vanadium, tetra-, tri- and dihalides such as the chlorides and bromides, tantalum penta- and trichlorides and bromides, chromic chloride and bromide, chromous chloride and iodide, molybdenum, di-, tri-, tetra- and pentachlorides, etc.

Just how the transition metals or their compounds act as catalysts is not known. When the metal halides are used as the catalyst, they are generally reduced to the free metal, or to hydrides which may be nonstoichiometric compounds. It is believed that one means by which such catalysts may be effective is through their hydrides, which act as hydrogen transfer agents. However, it may be that the action is through some embrittling process which permits ready deterioration of the metal lattice structure during reaction with hydrogen. In any event, the transition metals and their compounds do effect a true catalytic action in making possible milder conditions and/or greater conversions. Since it is a catalytic action, only a catalytic amount of the transition metal or transition metal compound is needed. Generally an amount of from about 0.5% to about 10% based on the weight of metal or metals being hydrogenated is used. Higher amounts can, of course, be used, but generally do not further augment the reaction.

As has already been pointed out above, the process in accordance with this invention can be used for the preparation of any alkali metal hydride, as for example, lithium hydride, sodium hydride, potassium hydride, etc., and for the preparation of the aluminum hydride complexes thereof, i.e. the alkali metal aluminum hydrides, such as lithium aluminum hydride ($LiAlH_4$), sodium aluminum hydride ($NaAlH_4$), etc.

Since some of these hydrides are more stable than others, the reaction conditions such as temperature and hydrogen pressure will be varied accordingly. The upper limiting conditions are, in general, complicated relationships between temperature and hydrogen pressure which are in turn related to the stability of the individual hydride. Thus, it is possible to operate, in a given hydride synthesis, at a higher temperature, and thus obtain higher reaction rate, provided the hydrogen pressure is sufficiently raised to prevent the reverse decomposition reaction. With less stable hydrides, for example, sodium aluminum hydride, a lower temperature and a higher pressure are advantageous, while in the synthesis of more stable hydrides such as sodium hydride, higher temperatures may be tolerated. However, except where secondary solvent reactions with hydrogen may occur, generally higher pressures are more conductive of higher reaction rates, although when employing the teachings of this invention, less drastic reaction conditions will be needed for given results than when employing other procedures. For the more stable metal hydrides, the lower limit of hydrogen pressure may be as low as a few atmospheres, and the hydrogen pressure may extend upward to a thousand atmospheres with the more difficulty synthesized hydrides. In general, the pressure will be within the range of from about 500 p.s.i. to about 10,000 p.s.i. of hydrogen pressure, and preferably will be from about 1000 p.s.i. to about 5000 p.s.i., and the temperature will be within the range of from about 80° C. to about 450° C. and more preferably from about 100° C. to about 200° C.

As already pointed out above, the process of this invention is even further enhanced when the reaction is carried out with comminution of the reaction mixture during the reaction. Such comminution may be carried out in a reactor rotating about a horizontal axis, or an axis at some angle with the horizontal. Since such reactions are invariably pressure reactions, continuous connection to the gage and pressure system may be provided by a suitable inlet through the axis, and suitably provided with a packing to prevent leakage. In such cases, the reactor is packed with generally spherical balls, such as of steel, in size or mixed sides such as are generally employed in the art of ball-milling.

A more convenient and generally preferred type of comminution reactor consists of a high pressure autoclave, with such pressuring, gaging, filling and emptying ports as may be necessary, but more specifically characterized by having a shaft and agitator so arranged as to continuously move and agitate a moving bed of balls or other attriting media. One such particularly convenient arrangement is to provide the pressure vessel, of generally cylindrical dimensions with the axis vertical, with a shaft driving an arrangement of paddles. This shaft should most conveniently be provided with a series of paddles, staggered on the shaft, both with respect to height and angular positioning on the shaft. Further, these paddles should best be of such dimensions that the outer edges reach to within a distance equal to the radius of the smallest balls used in attriting. Similarly, the paddles should be pitched on the shaft in such a manner as to impart both a tangential and a vertical component to the balls. Furthermore, the bottom paddle should be of similar specifications so as to continually sweep the bottom of the reactor relatively free of balls, and chemical species involved in the reaction. By adhering to the specification that the paddles approach the walls to within a radial distance of the smallest balls, the device will not become wedged or fouled. These dimensional limitations are particularly desirable where the internal diameter of the reactor is less than twenty times the average diameter of the balls. In height, the dimensions may be of any convenient value.

With reactors having diameters larger than about fifteen times the average ball diameter, due to machining difficulties and wear during use, it is frequently more desirable to provide a considerably larger clearance between the outer edge of the paddle and the reactor wall. In such cases, it has been found that a clearance in excess of 2.5 average ball diameters (5 average radii) is conducive to proper operation.

The process of this invention is advantageously carried out in the presence of an inert, liquid, organic diluent as a solvent or slurry vehicle. Generally these diluents will be electron donor compounds which are inert under the reaction conditions, i.e. are resistant to hydrogenation, hydrogenolysis or reduction by the intermediate or final hydrides, and which at the same time provide the desirable solubility characteristics. Preferably they will be a solvent for the product, or a hydride intermediate, and not for the starting metal. Typical diluents having such characteristics are, for example, aliphatic and cyclic ethers such as diethyl ether, methyl ethyl ether, methyl propyl ether, dioxane, tetrahydrofuran, etc.; polyethers, such as diethylene glycol dimethyl ether, triethylene glycol dimethyl ether, triethylene glycol diethyl ether, etc., aliphatic and cycloaliphatic tertiary amines such as trimethylamine, triethylamine, tri-n-butylamine, triamylamine and other trialkylamines; dialkylcyclohexylamines such as dimethylcyclohexylamine, diethylcyclohexylamine, etc., and heterocyclic tertiary amines such as pyridine, etc.

While a diluent that is a solvent or partial solvent for the product is frequently the more desirable type of diluent to use, the process of this invention is just as readily carried out using any organic liquid which in inert under the reaction conditions. Exemplary of such vehicles that may be so used are liquid saturated aliphatic hydrocarbons, as for example, hexane, n-heptane, octane, etc., or any of the commercial mixtures of saturated aliphatic hydrocarbons. Obviously, mixtures of any of these diluents can be used and in some cases may be desirable.

When employing solvents or slurry vehicles, it is generally advisable to operate with the metal or hydride reactants at as high a concentration as possible to obtain highest production from a given piece of equipment. However, there is always an upper limit of solution concentration or slurry vehicle concentration, caused by limited solubility or by a concentration above which effective milling is difficult. These will range from a low of a few percent to an upper limit which is generally less than about 30% solids, and preferably will be within the range of from about 5 to 20% solids.

It is generally desirable to charge the metal or metal hydride reactants in a form of previous subdivision, rather than as massive materials. This is advantageous from the standpoint of introducing the material through the usually restricted diameter of high pressure connections, but particularly because it minimizes the comminution which must be done in the mill reactor itself. For example, sodium can be introduced as a dispersion, prepared by the means well known in the art. Other metals, such as aluminum, may be previously subdivided by atomizing in air or with an inert gas. Filings or other finely divided metals may of course be employed. It is particularly advantageous to have previously milled the metal externally, in a suitable inert vehicle, and suitably protected from oxidation, and sometimes with traces of protective "getters" to minimize oxidation. Previous milling renders the metal to a form of flat leaflets with a maximum of surface, and a surface which remains relatively constant during subsequent reaction until the individual particle relatively suddenly disappears. Milling, before and during reaction, serves to provide a maximum constant rate during the whole reaction time.

The alkali metal hydrides and their mixed aluminum hydrides, and specifically those produced by this invention, may be used in a variety of ways known to the chemical and technological industries. In particular, hydrides, such as sodium hydride and lithium hydride, may be employed as reducing agents for organic functional groups, where it is desirable to obtain specific results, or where the use of hydrogen under pressure with catalysts is not desired. Several of the mixed metal hydrides such as lithium aluminum hydride and sodium aluminum hydride ries. Tabulated below is the data for each of these examples.

TABLE

| Example | Alkali Metal | G. | Al, g. | Diluent | Catalyst | G. | Hydrogen Pressure, p.s.i. | Temp., °C. | Time, hrs. | Product | Percent Conv. |
|---|---|---|---|---|---|---|---|---|---|---|---|
| 1 | Na | 46 | 54 | 50:50 H:THF | TiCl$_3$ | 6 | 4,000 | 150 | 2.67 | NaAlH$_4$ | 60 |
| 2 | Na | 46 | 54 | 80:10 H:THF | TiCl$_3$ | 6 | 4,000 | 150 | 2.25 | NaAlH$_4$ | 59 |
| 3 | Na | 46 | 54 | THF | TiH$_2$ | 3 | 3,000 | 150 | 3.5 | NaAlH$_4$ | 73 |
| 4 | Na | 46 | 54 | THF | VCl$_2$ | 3 | 4,000 | 150 | 4 | NaAlH$_4$ | 60 |
| 5 | Na | 46 | 54 | THF | CrCl$_3$ | 3 | 4,000 | 150 | 4 | NaAlH$_4$ | 55 |
| 6 | Na | 46 | 54 | THF | Ti | 3 | 4,000 | 150 | 4 | NaAlH$_4$ | 65 |
| 7 | Li | 15 | 54 | Ether | TiH$_2$ | 1.5 | 4,500 | 125 | 6 | LiAlH$_4$ | 65 |
| 8 | Na | 42.5 | | H | TiH$_2$ | 1.5 | 1,000 | 150 | 2.5 | NaH | 100 | have very wide application as special purpose reducing agents, and they may also be used as solid propellant fuels when combined with suitable oxidizers, by which relatively high specific impulses are obtained. Sodium aluminum hydride and lithium aluminum hydride can also be used to prepare other mixed metal hydrides, for example, magnesium aluminum hydride by reaction with anhydrous magnesium halides.

The following examples will illustrate the process of this invention. All parts and percentages are by weight unless otherwise specified.

In each of these examples, the reaction was carried out in a mill reactor which was a 3-quart high pressure steel reaction vessel of cylindrical internal dimensions, and rated for operation at 5000 p.s.i.g. at 300° C. It was provided with means for pressuring with hydrogen, thermocouple for measuring the temperature of the reaction, and a vertical agitator which had four paddles in staggered position on the agitator shaft. Each paddle was tilted at 15° with the vertical so as to impart a vertical as well as a tangential component to the balls. The reactor was filled approximately two-thirds full with steel balls of ⅜ inch diameter. For each run, the reactor was evacuated and filled with nitrogen.

Examples 1–8

The mill reactor in each example was charged with the given weight of metal or metals and then with the diluent, 400 ml. each of n-heptane (H) and tetrahydrofuran (THF) in Example 1; 800 ml. of n-heptane and 100 ml. of tetrahydrofuran in Example 2; 800 ml. of tetrahydrofuran in Example 3; 650 ml. of tetrahydrofuran or diethyl ether in Examples 4–7 and 700 ml. of n-heptane in Example 8. In Example 8 there was also charged 2 g. of oleic acid as a dispersing agent for the sodium. The indicated amount of catalyst was then added and in Examples 1–3 the reaction was milled at room temperature for 2 hours, 2.5 hours in Examples 4–6 and 3 hours in Example 7. The reaction mixtures were then heated to the reaction temperature, at which point hydrogen pressure was applied. In Example 8 the reaction mixture was directly heated to the reaction temperature and hydrogen pressure applied without premilling. The hydrogen pressure was maintained by repressuring as necessary during the runs, and the runs were stopped when no further pressure drop was observed. The reactor contents were then cooled, the reactor vented, flushed with nitrogen and the contents transferred under nitrogen to a receiver. In Example 7, after cooling the reaction mixture, the ether was removed by distillation and replaced by an equal volume of dry n-heptane. The percent conversion was determined in each case by analysis of the product slurries.

What I claim and desire to protect by Letters Patent is:

1. The process of preparing alkali metal hydrides which comprises contacting a mixture of an alkali metal and at least a catalytic amount of a catalyst selected from the group consisting of the metals of Groups IV–B, V–B, and VI–B of the Periodic Table, and the halides and hydrides of said metals, with hydrogen under superatmospheric pressure at a temperature of from about 80° C. to about 450° C., in an inert, liquid, organic diluent.

2. The process of claim 1 wherein the reaction is carried out at a temperature of from about 100° C. to about 200° C. and at a hydrogen pressure of from about 500 p.s.i. to about 10,000 p.s.i.

3. The process of claim 3 wherein the catalyst is titanium.

4. The process of claim 2 wherein the catalyst is a titanium halide.

5. The process of claim 2 wherein the catalyst is titanium hydride.

6. The process of preparing sodium hydride which comprises contacting a mixture consisting of sodium and at least a catalytic amount of a catalyst selected from the group consisting of the metals of Groups IV–B, V–B, and VI–B of the Periodic Table, and the halides and hydrides of said metals, with hydrogen at a temperature of from about 100° C. to about 200° C. and under a hydrogen pressure of from about 1000 p.s.i. to about 5000 p.s.i, in an inert, liquid, organic diluent.

7. The process of claim 1 wherein the reaction mixture is subjected to comminution during the reaction.

8. The process of claim 6 wherein the reaction mixture is subjected to comminution by ball-milling during the reaction.

9. The process of claim 8 wherein the catalyst is titanium hydride and the diluent is a saturated aliphatic hydrocarbon.

References Cited

UNITED STATES PATENTS

| 2,550,985 | 5/1951 | Finholt | 23—365 XR |
| 2,720,444 | 10/1955 | Banus et al. | 23—204 XR |
| 3,138,433 | 6/1964 | Del Guidice | 23—365 |

FOREIGN PATENTS 747,459  6/1933  France.

OTHER REFERENCES

Halpern: "Advances In Catalysis," 1959, vol. XI, pp. 348–350 (copy in Sci. Lib.).

Zakharkin et al.: Academy of Sciences, U.S.S.R., Proceedings, Chemistry Section, vol. 145, August 1962, pp. 656–658 (English translation of Russian article), copy in 23/365.

MILTON WEISSMAN, *Primary Examiner.*

UNITED STATES PATENT OFFICE
CERTIFICATE OF CORRECTION

Patent No. 3,387,933            June 11, 1968

John C. Snyder

It is certified that error appears in the above identified patent and that said Letters Patent are hereby corrected as shown below:

Column 3, line 17, "conductive" should read -- conducive --. Column 4, line 28, "in" should read -- is --. Column 6, line 27, "The process of claim 3" should read -- The process of claim 2 --.

Signed and sealed this 14th day of October 1969.

(SEAL)
Attest:

Edward M. Fletcher, Jr.           WILLIAM E. SCHUYLER, JR.
Attesting Officer                Commissioner of Patents